(12) United States Patent
Yaniv et al.

(10) Patent No.: US 7,195,938 B2
(45) Date of Patent: Mar. 27, 2007

(54) ACTIVATION EFFECT ON CARBON NANOTUBES

(75) Inventors: Zvi Yaniv, Austin, TX (US); Richard Lee Fink, Austin, TX (US); Mohshi Yang, Austin, TX (US); Dongsheng Mao, Austin, TX (US)

(73) Assignee: Nano-Proprietary, Inc., Austin, TX (US)

( * ) Notice: Subject to any disclaimer, the term of this patent is extended or adjusted under 35 U.S.C. 154(b) by 203 days.

(21) Appl. No.: 10/269,577

(22) Filed: Oct. 11, 2002

(65) Prior Publication Data

US 2003/0092207 A1 May 15, 2003

Related U.S. Application Data

(60) Provisional application No. 60/369,794, filed on Apr. 4, 2002, provisional application No. 60/348,856, filed on Jan. 15, 2002, provisional application No. 60/343,642, filed on Oct. 19, 2001.

(51) Int. Cl.
*H01L 51/00* (2006.01)
*H01J 1/30* (2006.01)
*H01J 1/304* (2006.01)
*H01J 9/02* (2006.01)

(52) U.S. Cl. .......... 438/20; 977/858; 977/888; 156/247; 313/310; 445/50; 445/51; 438/99

(58) Field of Classification Search ............... 438/20, 438/99; 313/310; 156/247; 441/51; 977/DIG. 1, 977/855, 857, 858, 888; 445/50, 51
See application file for complete search history.

(56) References Cited

U.S. PATENT DOCUMENTS

| | | | | |
|---|---|---|---|---|
| 5,726,524 A | * | 3/1998 | Debe | 313/309 |
| 6,057,637 A | * | 5/2000 | Zettl et al. | 313/310 |
| 6,239,547 B1 | * | 5/2001 | Uemura et al. | 313/495 |
| 6,250,984 B1 | * | 6/2001 | Jin et al. | 445/51 |
| 6,277,318 B1 | * | 8/2001 | Bower et al. | 264/346 |
| 6,297,592 B1 | * | 10/2001 | Goren et al. | 315/3.5 |
| 6,436,221 B1 | | 8/2002 | Chang et al. | 156/247 |
| 6,441,550 B1 | * | 8/2002 | Patterson et al. | 313/495 |
| 6,538,367 B1 | * | 3/2003 | Choi et al. | 313/309 |
| 6,553,096 B1 | * | 4/2003 | Zhou et al. | 378/122 |
| 6,616,495 B1 | * | 9/2003 | Tsuboi | 445/24 |
| 6,630,772 B1 | * | 10/2003 | Bower et al. | 313/311 |
| 6,798,127 B2 | * | 9/2004 | Mao et al. | 313/311 |
| 6,850,595 B2 | * | 2/2005 | Zhou et al. | 378/122 |
| 6,900,066 B2 | * | 5/2005 | Toyota et al. | 438/20 |
| 7,040,948 B2 | * | 5/2006 | Mao et al. | 445/25 |
| 7,118,440 B2 | * | 10/2006 | Kuo et al. | 445/51 |
| 2002/0104603 A1 | * | 8/2002 | Chang et al. | 156/89.12 |
| 2002/0109086 A1 | * | 8/2002 | Colbert et al. | 250/306 |

(Continued)

FOREIGN PATENT DOCUMENTS

EP 0 989 579 A2 3/2000

*Primary Examiner*—M. Wilczewski
(74) *Attorney, Agent, or Firm*—Fish & Richardson P.C.; Kelly K. Kordzik

(57) ABSTRACT

Particles, which may include nanoparticles, are mixed with carbon nanotubes and deposited on a substrate to form a cold cathode. The particles enhance the field emission characteristics of the carbon nanotubes. An additional activation step may be performed on the deposited carbon nanotube mixture to further enhance the emission of electrons.

8 Claims, 14 Drawing Sheets

U.S. PATENT DOCUMENTS

| | | | |
|---|---|---|---|
| 2004/0191698 A1* | 9/2004 | Yagi et al. | 430/320 |
| 2004/0217382 A1* | 11/2004 | Konuma | 257/202 |
| 2005/0001528 A1* | 1/2005 | Mao et al. | 313/309 |
| 2005/0095360 A1* | 5/2005 | Li et al. | 427/240 |
| 2005/0102044 A1* | 5/2005 | Kohn et al. | 700/28 |
| 2005/0244991 A1* | 11/2005 | Mao et al. | 438/21 |
| 2006/0193972 A1* | 8/2006 | Mao et al. | 427/122 |
| 2006/0246810 A1* | 11/2006 | Lee et al. | 445/24 |

* cited by examiner

FIG. 4
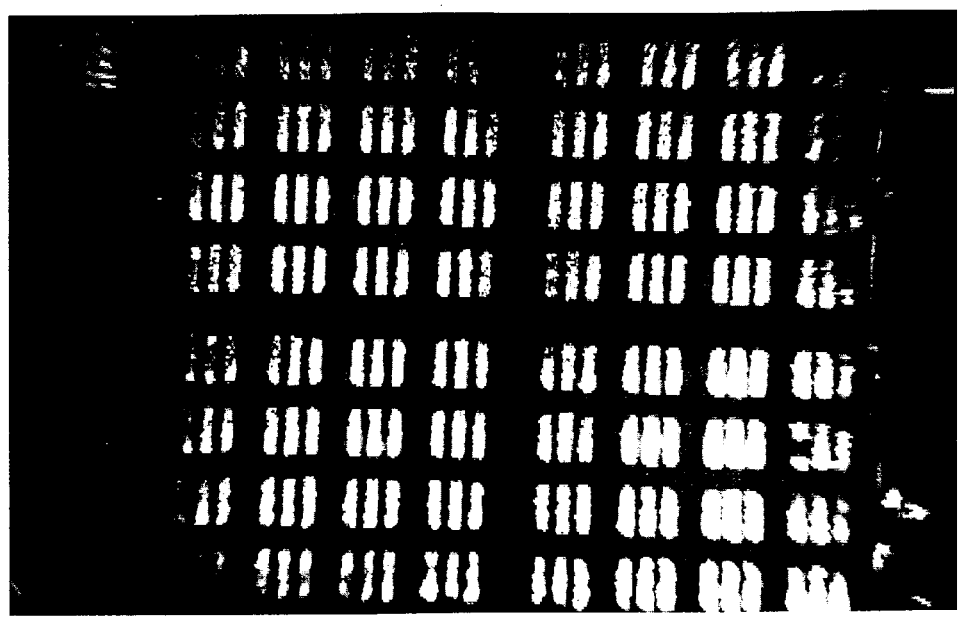
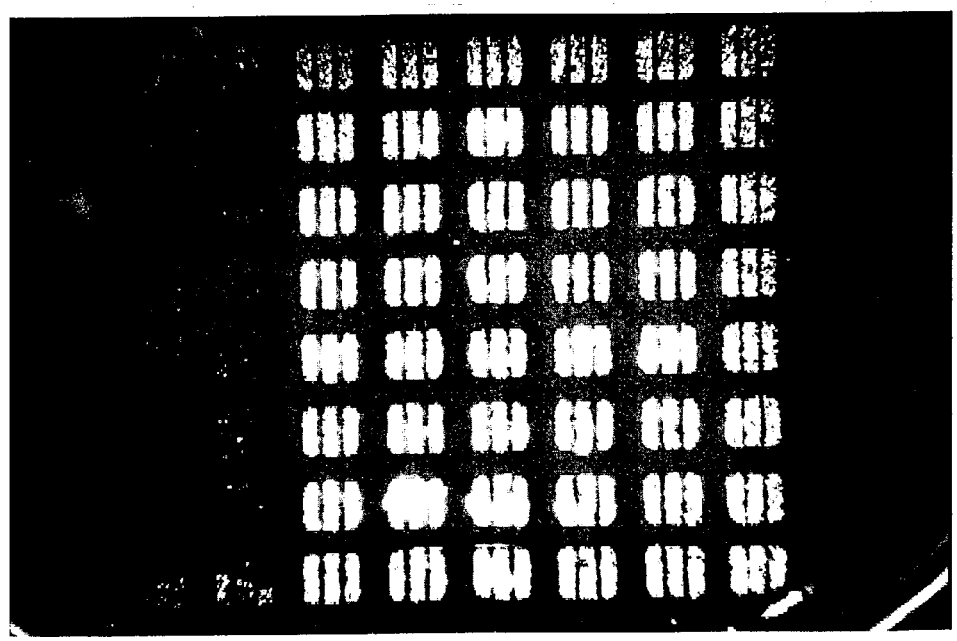
FIG. 5

ACTIVATION EFFECT ON CARBON NANOTUBES

CROSS REFERENCE TO RELATED APPLICATIONS

The present application claims priority to the following U.S. Provisional Patent Applications, Ser. Nos. 60/343,642, filed Oct. 19, 2001, 60/348,856, filed Jan. 15, 2002, and 60/369,794 filed Apr. 4, 2002.

TECHNICAL FIELD

The present invention relates in general to carbon nanotubes, and in particular, to the utilization of carbon nanotubes in field emission applications.

BACKGROUND INFORMATION

Carbon nanotubes have been used by many for field emission applications. Carbon nanotubes (CNTs) come in two families, single wall nanotubes (SWNTs) and multi-wall nanotubes (MWNTs). Both materials are long (11–10,000 microns) and thin (0.001–0.1 microns in diameter). This high aspect ratio and the fact that they are semiconducting or metallic makes them ideal candidates for field emission applications. One problem, however, is if the CNTs are too densely packed, the CNTs shield each other from the strong electrical fields needed to extract the electrons from the material. The field emission from these materials is further improved if the CNT fibers are aligned in parallel to the applied electrical field. Also desired is an inexpensive way of applying the CNT material onto suitable substrate materials at low temperature and aligning these materials using methods that are suitable for large-scale manufacturing.

By growing CNTs directly on a catalyst, some success has been achieved in growing the CNT materials with acceptable density and alignment, but not always in a predictable fashion. Furthermore, the growth temperatures are high, too high for using low-temperature sodalime glass that is commonly used in the display industry.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a field emission image of a sample made with a process in accordance with the present invention;

FIG. 5 illustrates a field emission image of a sample made with one of the embodiments in accordance with the present invention;

DETAILED DESCRIPTION

Figure 1:
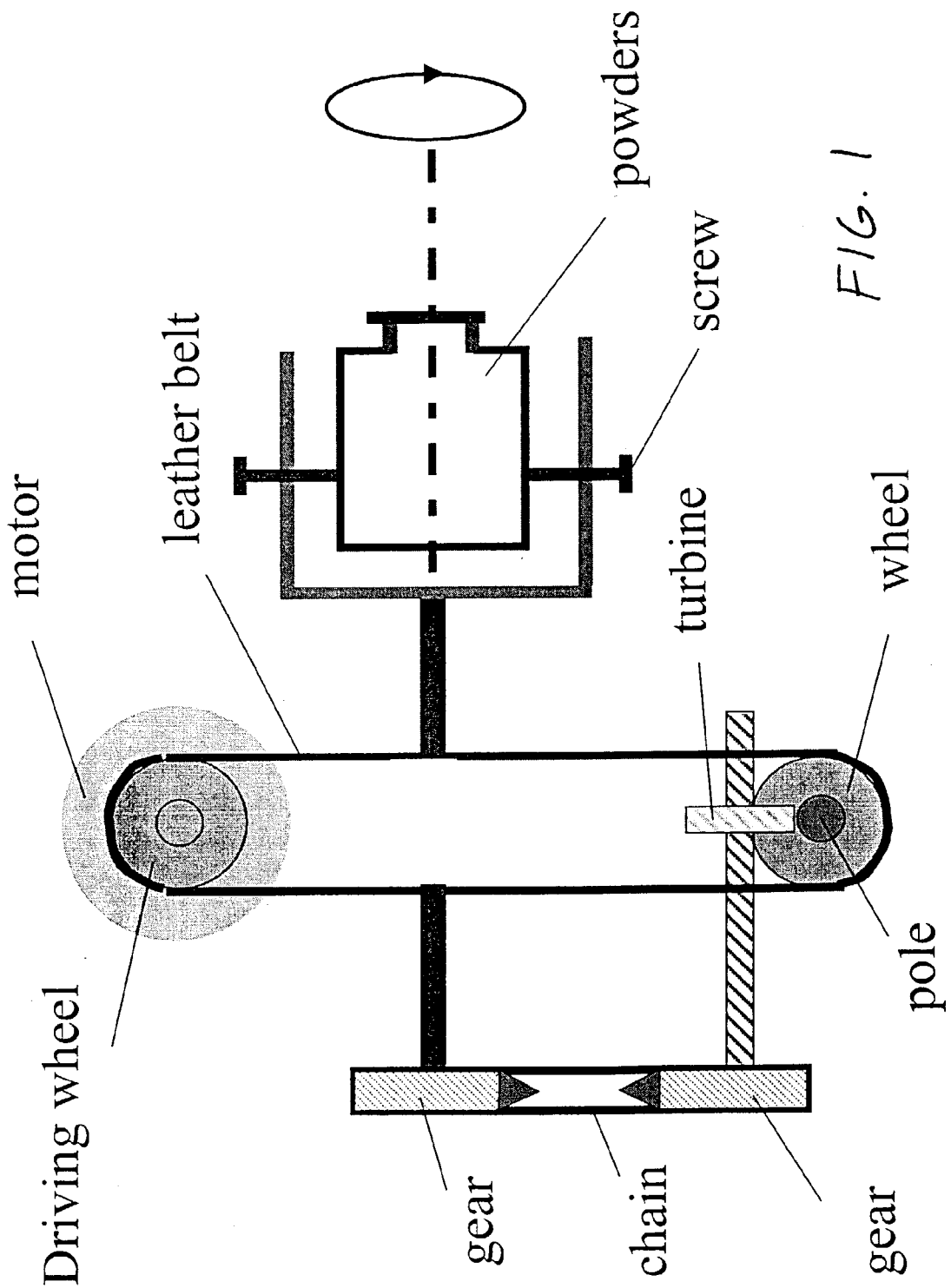
FIG. 1 illustrates a process in accordance with an embodiment of the present invention.

In the following description, numerous specific details are set forth such as specific cathode configurations to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention provides a method of applying CNT materials onto almost any substrate material and activating for field emission the CNT fibers in a reproducible and inexpensive manner.

The source of carbon nanotube powders can be purified single-wall carbon nanotube (SWNT) powders from Carbon Nanotechnologies, Inc. (Part # HPR92 S13). These SWNTs were 1 nm in diameter and 100~1000 nm in length. But, any other kinds of single wall or multiwall carbon nanotubes can also be used in this method. There is no need to purify the CNT materials to eliminate the catalyst from the carbon.

One method is to grind the CNT materials into shorter lengths. This allows better control of material properties. In some cases, satisfactory results may be achieved without grinding. A typical ball mill was used to grind CNT bundles. FIG. 1 is the schematic diagram of such a ball mill. The rate of this machine is about 50~60 revolutions per minute. In this method, 0.2 g CNT bundles as well as 40–100 $Al_2O_3$ balls (5~10 mm in diameter) were mixed into 200~300 ml IPA (Isopropyl alcohol). The mixture was ground for 1~7 days in order to disperse the CNTs. A surfactant (Triton® X-100, about 1 drop per 100 ml IPA) or other kind of materials can also be added to the mixture in order to achieve better dispersion of CNTs.

Other solvents can be used instead of IPA (e.g., acetone). Mixtures of solvents can also be used. Water or mixtures of water and solvent may also be used. IPA is inexpensive, is not extremely hazardous or toxic, and can be dried at relatively low temperatures.

Because the CNTs can easily agglomerate (stick to each other), an ultrasonic mixing process was applied to the CNT solution to disperse the CNTs again before spraying them onto the substrates. An ultrasonator made by (Sonics and Materials Inc., Danbury, Conn.) was used to further disperse the carbon nanotubes. Full power for 3–5 minutes, until the IPA starts to warm to about 40C. Other means of applying ultrasonic energy to the solution may also be tried.

Next, the process involves a spraying of the CNT mixture onto the substrate. In this method, the CNT mixture can be sprayed on various kinds of substrates such as metal, ceramic, glass, plastics, organic and semiconductors. The substrates can be coated with conducting, insulating or semiconducting patterned layers to provide electrical conductivity to some areas and electrical isolation or selected electrical resistance to other areas. These layers can be deposited using printing methods (thick film) or by evaporation, sputtering or other thin film methods. Standard photolithography patterning and/or etching processes may be needed for additional patterning of the added layers.

Figure 2:
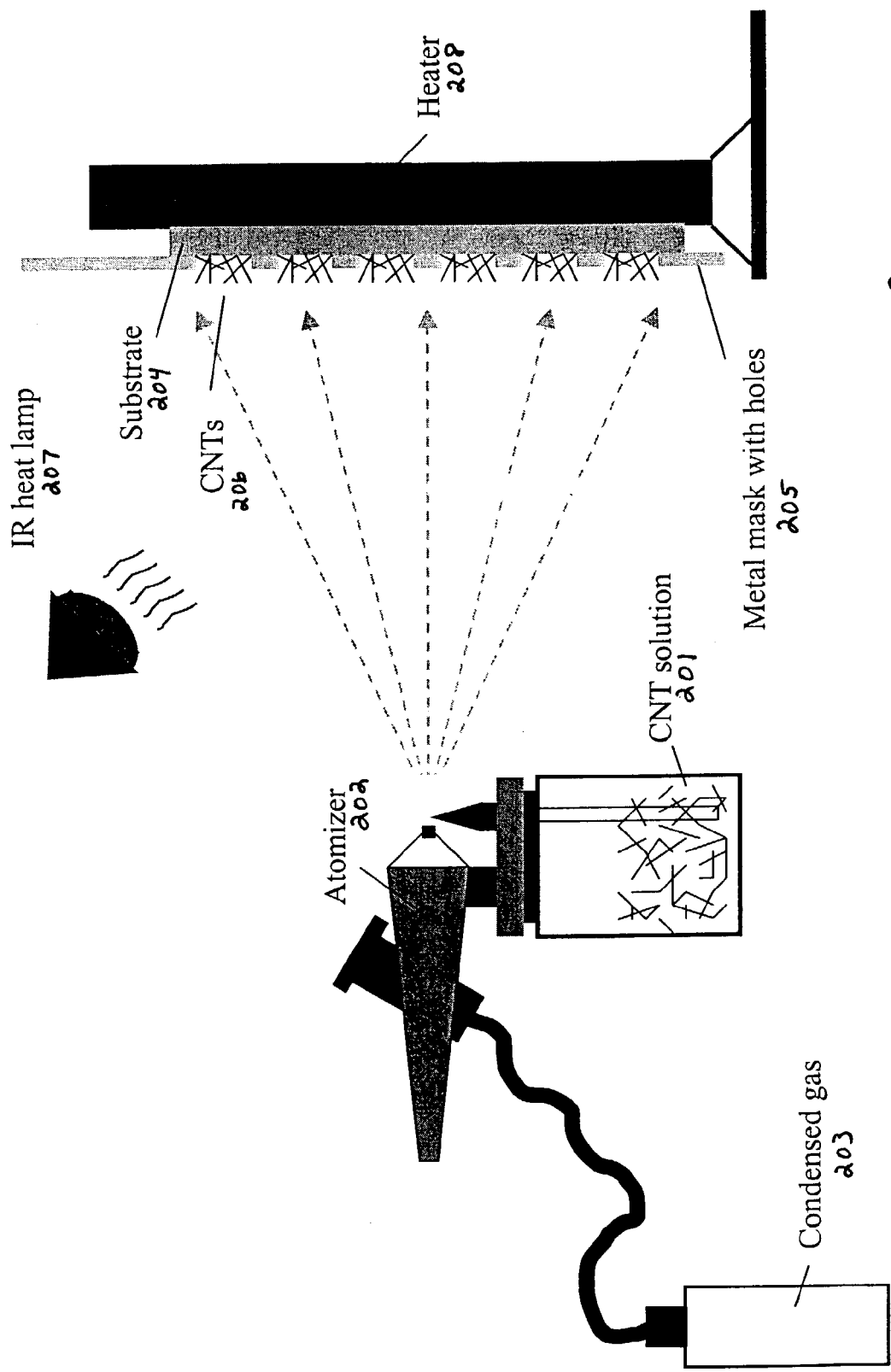
FIG. 2 illustrates a process for applying carbon nanotubes to a substrate.

Referring to FIG. 2, in order to get more uniform and well dispersed CNT solution coating on the substrates, more IPA can be added into the above solution before spraying. In this method, the CNT solution 201 for spray can be approximately 0.05 g CNT in 1000 ml IPA. Condensed gas 203 can charge an atomizer 202 to create the spray. CNT mixture 206 can be sprayed on selected areas by using a shadow mask 205. In order to prevent the solution 206 from flowing to unexpected areas, the substrate 204 can be heated up to 50C–100C both on the front side and back side during the spray process. The substrate 204 can be sprayed back and forth or up and down several times until the CNT mixture 206 covers the entire surface uniformly. The thickness of the CNTs 206 may be about 1~2 μm. Then they are dried in air naturally or using a heat lamp 207.

Ink jet printing or other printing techniques (or any other deposition process) may also be used to apply the CNT mixture to the substrate. Ink jet processes have advantages in a large scale manufacturing environment.

After the CNTs are sprayed on the substrate, a taping process may be used to remove some of the CNTs from the surface. In this method, 3M Scotch tape may be used to remove CNTs from the surface. But, many other varieties of tape can be used in this process. The tape is adhered on the CNT coating. It is important to be sure that there is no air between the tape and the CNT coating. If air exists between them, the CNTs at that area will not be removed. A rubber roller can be used to further press the tape in order to eliminate air gaps in the interface. Finally, the tape is removed by pulling up at one end. A very thin CNT layer is left on the substrate.

Figure 3A:
FIGS. 3A–3G illustrate a process in accordance with an embodiment of the present invention.
Figure 3B:
Figure 3C:
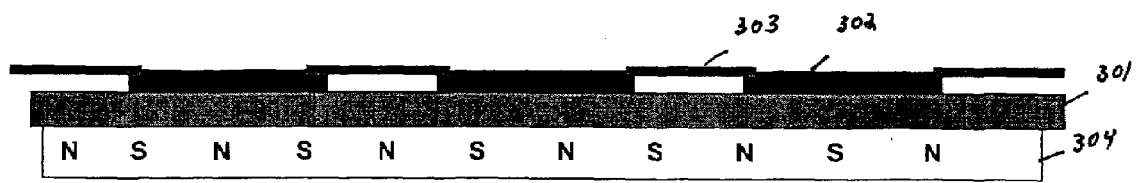
Figure 3D:
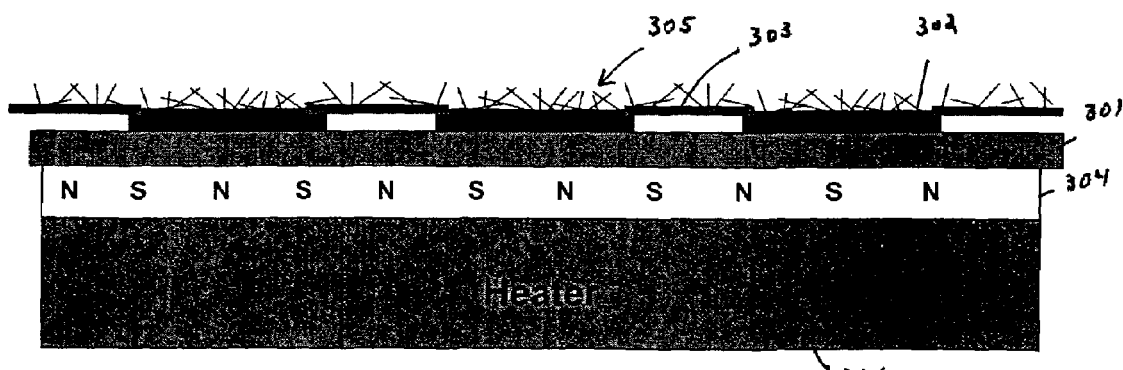

FIGS. 3A–3G illustrate in further detail the foregoing process. In FIG. 3A, a substrate 301 is cleaned. In FIG. 3B, conductive (e.g., feedlines 302 are added to substrate 301 by using printing methods. In FIG. 3C, a shadow mask 303 is added, wherein the holes in the shadow mask 303 are aligned to the areas of the substrate where it is desired to deposit the CNT material. A magnet 304 may be used to hold the shadow mask 303 to the substrate 301. In FIG. 3D, the foregoing spraying process (see FIG. 2) is used to spray on the CNT mixture 305. The solvent in the mixture 305 evaporates leaving the CNT material 305. A heater 306 is applied to the back of the substrate 301 and magnet 304, and alternatively, a heat lamp (not shown) may also be used on the front, to speed the evaporation process and to keep the mixture from running under the mask 303.

Figure 3E:

FIG. 3E shows the cold cathode after the mask 303, magnet 304 and heater 306 are removed. The CNT material 305 is patterned on the feedlines 302. The CNT material 305 may be left to dry further if required.

Figure 3F:
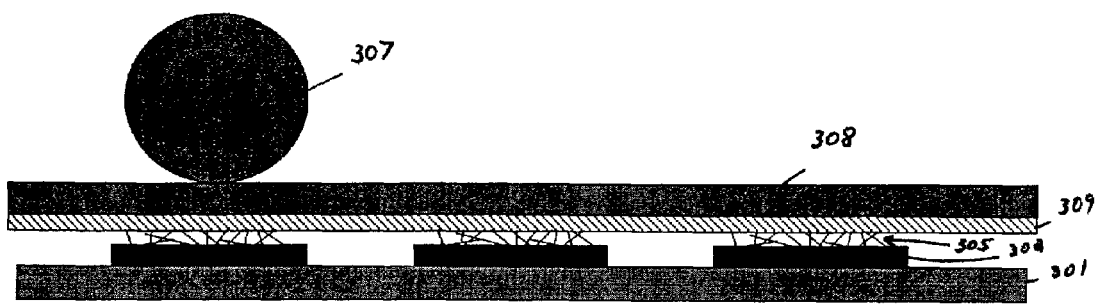

FIG. 3F shows the application of tape 309 to the surface of the cathode with the adhesive of the tape in contact with the CNT material 305. The tape 309 may be applied to a tape substrate 308. Rolling of the tape may be used to further press the tape 309 onto the CNT material 305 using a compliant roller 307.

Figure 3G:
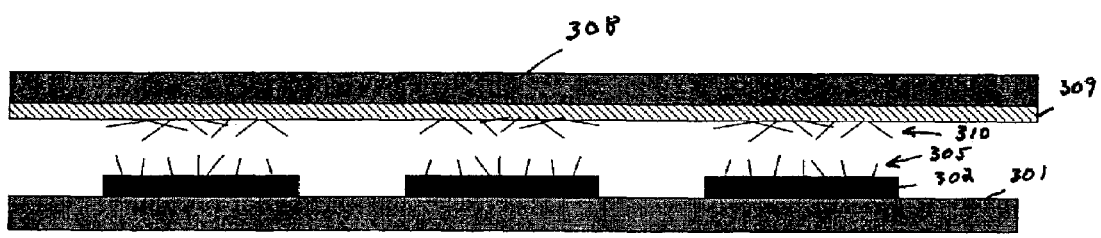

FIG. 3G shows the removing of the tape 309. This can be done by pulling up from one end to the other of the substrate backing 308. Portions 310 of the CNT material 305 are thus removed with the tape 309 leaving the CNT materials 305 on the feedlines 302 aligned. The tape 309 can be discarded.

A field emission image of a sample cold cathode created by this process is shown in FIG. 4.

The technique of mixing carbon nanotubes with host materials such as adhesives of all kind is known (sometime this is called "carbon nanotubes in a paste"). This paste is generally printed (for example, screen printed) on a substrate to define localized emission spots. In these emission spots, carbon nanotubes are homogeneously mixed with the paste. In the virgin situation after printing, the carbon nanotubes possess a random orientation on the paste, meaning that a large part of the nanotubes are oriented at different angles with respect to the vertical of the substrate, but also many other carbon nanotubes are distributed similarly around a line parallel to the substrate. As a result, the contribution to field emission of these carbon nanotubes that are not oriented vertically with respect to the substrate is minimal or null. Furthermore, the existence of a high concentration of carbon fibers in the material and the random orientation can create non-optimized electric field distribution in the paste including the carbon nanotubes and as a result shielding effects between neighboring nanotubes.

It is desirable to have a process whereby one can re-align these nanotubes, mechanically or otherwise, and also would be very important to lower in some cases the density of the carbon nanotubes in order to lower the shielding effect in an active device. This process can be implemented utilizing existing soft adhesives in the sense that a sustaining substrate that is coated with these soft adhesives can be applied to the surface of the printed paste including carbon nanotubes such that in a pulling process using the above soft adhesives, one can exercise suitable force on the carbon nanotubes to achieve the following results:

a) Increase the concentration of carbon nanotubes aligned vertically or with the small distribution with respect to the normal to the substrate;

b) Pull some of the carbon nanotubes totally out of the mixture to achieve optimal carbon nanotube surface density; and c) By using an optimal soft adhesive minimizing the surface contamination of the emissive area still achieving results a and b above.

Figure 6A:
FIGS. 6A–6E illustrate a process in accordance with the present invention for applying carbon nanotubes to a substrate.
Figure 6B:
Figure 6C:
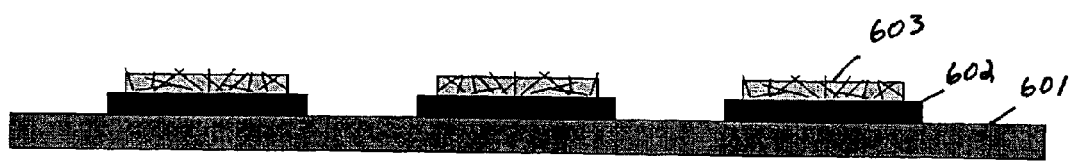

Excellent emission results can be obtained utilizing this technology. FIG. 5 illustrates a field emission image of a cold cathode sample created with the "carbon nanotubes in a paste" process described in further detail with respect to FIGS. 6A–6B. In FIG. 6A, a substrate 601 is cleaned. In FIG. 6B, conductive (e.g., metal) feedlines 602 are deposited on substrate 601 using printing methods. FIG. 6C shows the mixture of CNT material mixed with a paste 603 printed in a pattern on the feedlines 602. The paste 603 may consist of CNT material, silver paste, glass frit, a glass frit vehicle, and a glass frit thinner. An example of this paste is 0.5 grams CNT material, 1.4 grams frit vehicle, and 1.25 grams of silver paste (silver paste may be a Dupont product 7713, Conductor Composition; frit vehicle may be a Daejoo Vehicle DJB-715 from Daejoo Fine Chemical Co., Ltd., or from Pierce and Stevens F1016A02; CNT material may be provided by Carbon Nanotechnologies, Inc., purified or unpurified (CNT material may be multi-wall or single-wall)).

Figure 6D:
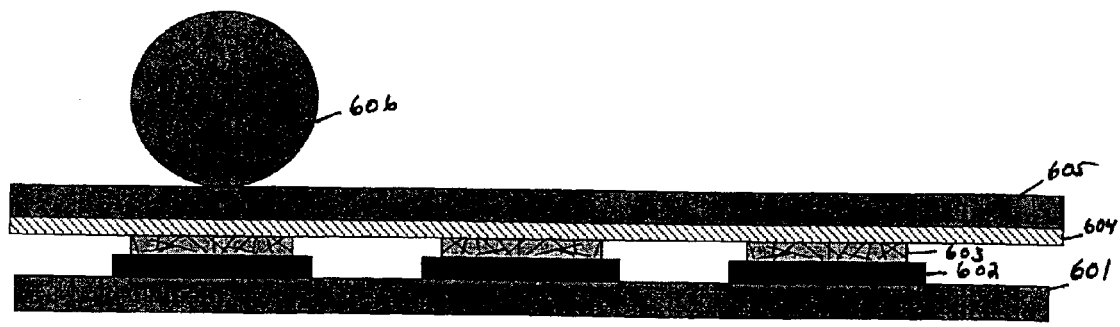
Figure 6E:
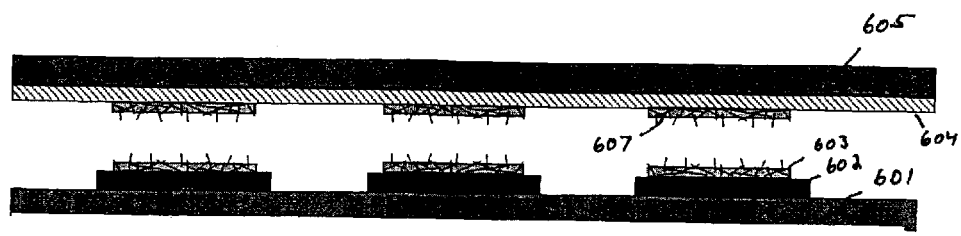

In FIG. 6D, an adhesive tape 604 applied to a backing 605 may be applied to the surface of the cathode such that the adhesive 604 of the tape is in contact with the CNT paste material 603. A roller 606 may be used to apply uniform contact pressure. FIG. 6E shows the tape 604 being removed by peeling from one side to the other. Some of the CNT material paste 607 is pulled off with the tape 604. In this process, the CNT fibers are aligned in the vertical direction, and the density of the CNT fibers 603 not aligned is reduced.

An alternative process is the utilization of single wall or multi-wall or a mixture of single wall and multi-wall carbon nanotubes in IPA (alcohol or other solvent) host. Furthermore, in order to homogenize the solution of carbon nanotubes and IPA, certain chemicals are added to the mixture in order to diminish the surface forces between the carbon nanotubes and obtain isolated carbon nanotubes in a homogeneous mixture with the IPA with minimal bundles (aggregates or clusters of carbon nanotubes all together).

An advantage of this method is that by obtaining this homogeneous mixture, a spraying process can be utilized through a mechanical or other kind of mask such that spraying this mixture directly onto the active substrate through the mask will localize the carbon nanotubes on the future emission sites, and the fixation of these carbon nanotubes will be achieved by spraying onto the substrate where the substrate temperature is 50–100 degrees C.

Furthermore, after the fixation of the carbon nanotubes on the desired emissive locations, the same pulling technique can be used, but this time the pulling forces will be exercised more uniformly on all the carbon nanotubes that are exposed in the first layers on the sprayed material. As a result the aligning process and the decrease in the density of the carbon nanotubes is more efficient, more effective and more controllable.

Figure 8:
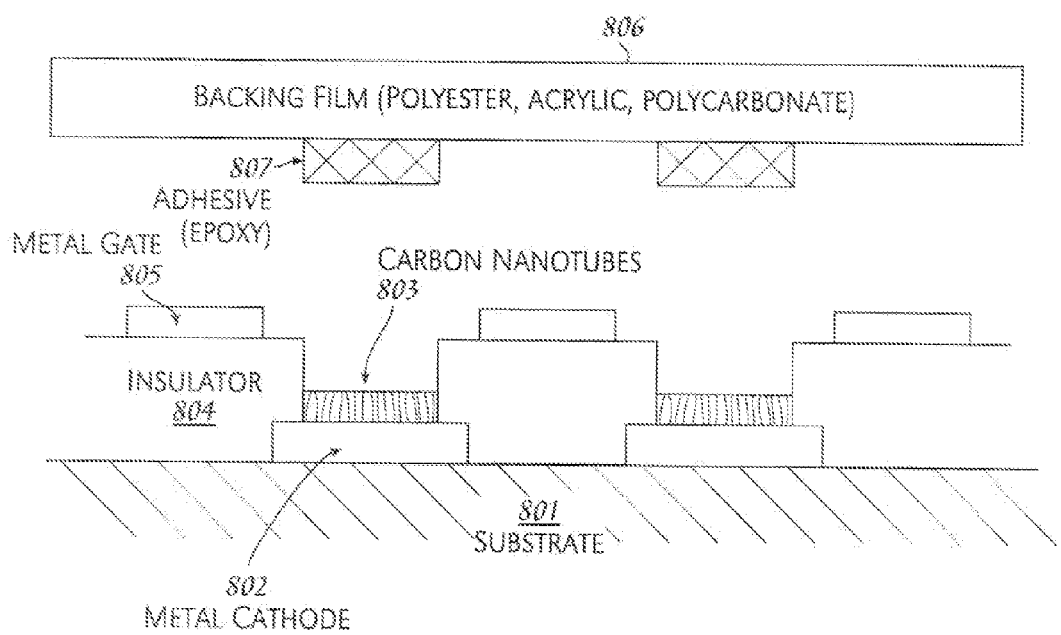
FIG. 8 illustrates another process for activating an electron source material in accordance with an embodiment of the present invention.

Referring to FIG. 8, there is illustrated an alternative embodiment whereby a patterned, or embossed, activation surface is used to activate the electron source material in a manner as described previously. Often the cathode plate with the electron source is not a flat surface, which lends itself to activation from a flat activation surface (e.g., adhesive tape). Therefore, when the tape is applied, it may not be able to adequately activate the electron source material, which in this example is the carbon nanotubes. To address the problem, an embossed activation surface can be used so that the adhesive is able to reach down to the electron source material at each pixel site. Moreover, areas that do not need to be activated are not subject to contact with the adhesive material. Note, such a patterned activation surface can be used without embossing where only certain areas need to be activated. In FIG. 8, a substrate 801 has a conductive cathode 802 pattern thereon, and patterned insulators 804 with metal gates 805 deposited thereon. Carbon nanotubes 803 are then deposited onto the cathodes 802. To activate the carbon nanotubes 803, the adhesive 807 may be embossed onto a backing film 806 so that the adhesive 807 reaches down to the carbon nanotubes 803 within the insulator 804 walls.

Figure 7:
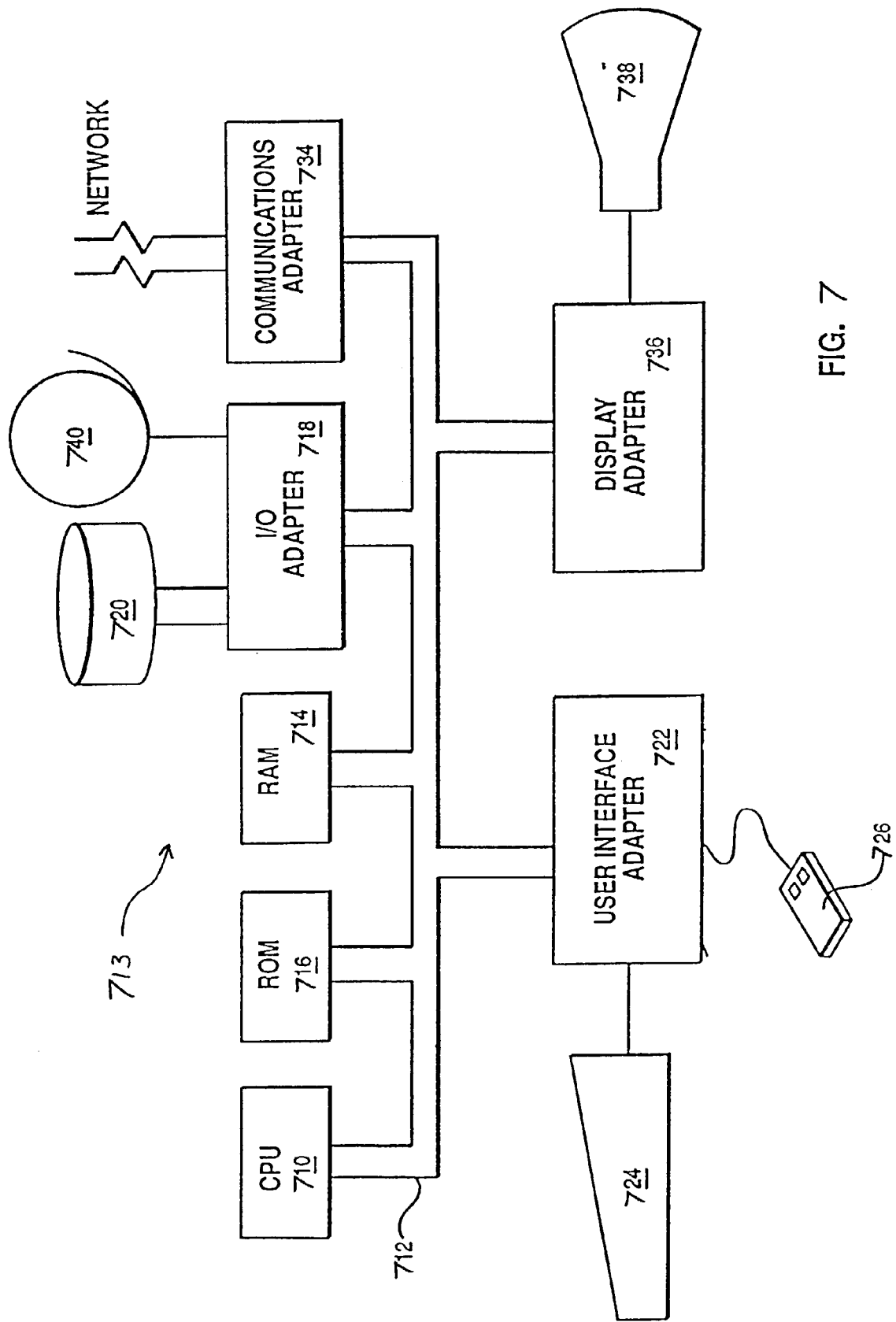
FIG. 7 illustrates a data processing system configured in accordance with the present invention.

A representative hardware environment for practicing the present invention is depicted in FIG. 7, which illustrates an exemplary hardware configuration of data processing system 713 in accordance with the subject invention having central processing unit (CPU) 710, such as a conventional microprocessor, and a number of other units interconnected via system bus 712. Data processing system 713 includes random access memory (RAM) 714, read only memory (ROM) 716, and input/output (I/O) adapter 718 for connecting peripheral devices such as disk units 720 and tape drives 740 to bus 712, user interface adapter 722 for connecting keyboard 724, Mouse 726, and/or other user interface devices such as a touch screen device (not shown) to bus 712, communication adapter 734 for connecting data processing system 713 to a data processing network, and display adapter 736 for connecting bus 712 to display device 738. CPU 710 may include other circuitry not shown, which will include circuitry commonly found within a microprocessor, e.g., execution unit, bus interface unit, arithmetic logic unit, etc. CPU 710 may also reside on a single integrated circuit. Display device 738 can implement the display technology described herein.

Figure 9:
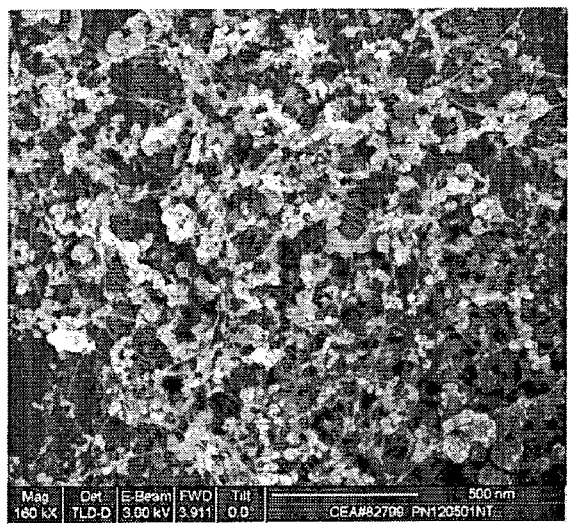
FIG. 9 illustrates carbon nanotubes on a silicon wafer applied in a paste.
Figure 10:
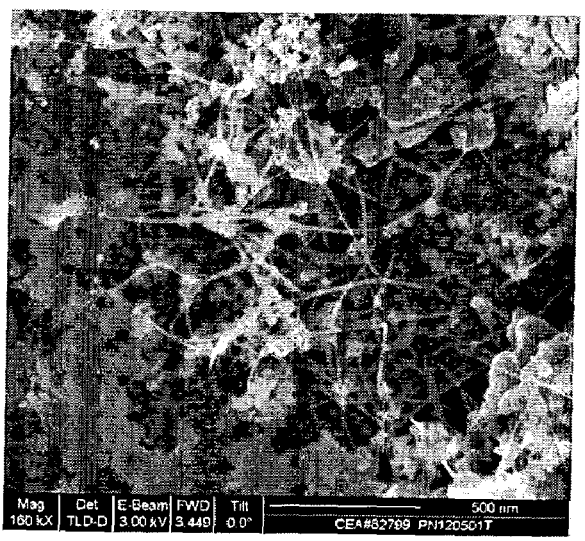
FIG. 10 illustrates carbon nanotubes on a silicon wafer applied in a paste and activated.
Figure 11:
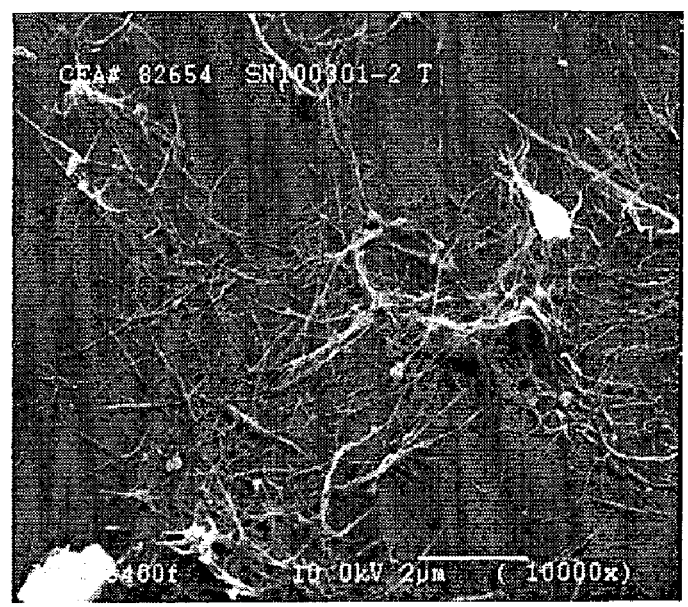
FIG. 11 illustrates carbon nanotubes applied using a spray method.

Either utilizing CVD to grow nanotubes or spraying or mixing nanotubes into a paste, then applying to a substrate for electron field emissions, it appears that electron emission current is strongly related to carbon nanotube density when applied onto substrates. It has been found that by activating the surface (e.g., by using adhesive tape to remove some carbon nanotube material) better electron emission characteristics can be achieved. For example, four samples of spray and paste carbon nanotubes on silicon wafers were made, one of the wafers activated from each group and one wafer kept as control. These were then inspected and nanotubes counted per square area from high power SEM pictures. FIG. 9 illustrates the SEM picture from the paste control wafer, while FIG. 10 illustrates the paste-activated wafer. FIG. 11 illustrates the spray-activated wafer. The following table shows the CNT density per square centimeter for each of the samples.

| CNT DENSITY PER SQUARE CENTIMETER | | | |
|---|---|---|---|
| Paste-Control Wafer | Paste-Activated Wafer | Spray-Control Wafer | Spray-Activated Wafer |
| ~$1 \times 10^{10}$ | ~$1 \times 10^9$ | ~$1 \times 10^{10} - 1 \times 10^{11}$ | ~$1 \times 10^8 - 1 \times 10^9$ |

Figure 12:
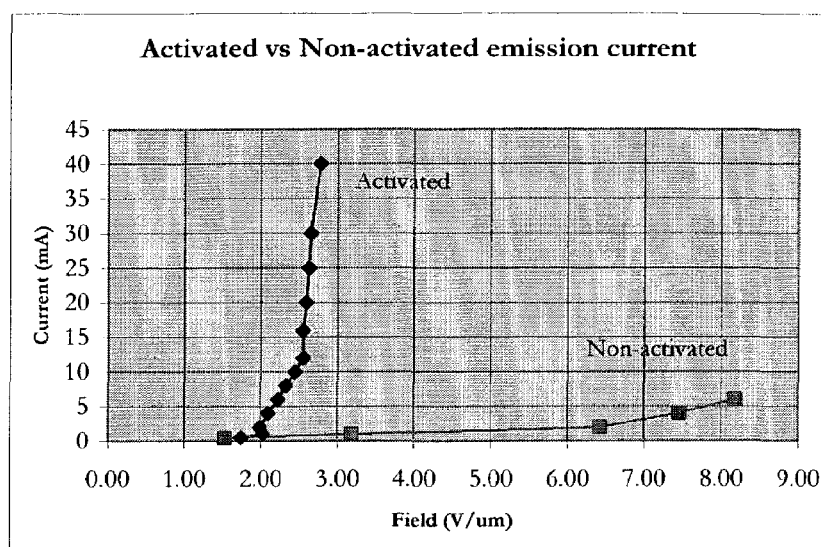
FIG. 12 illustrates a graph of current versus electrical field for activated and non-activated carbon nanotubes.
Figure 13:
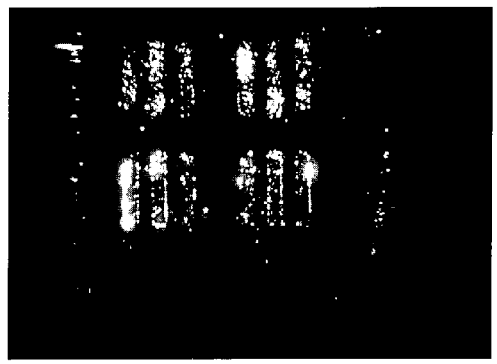
FIG. 13 illustrates an image of emission sites of non-activated pixels.
Figure 14:
FIG. 14 illustrates an image of emission sites from activated pixels in accordance with the present invention.

Referring to FIG. 12, the emission from the activated devices was much better than that of the non-activated devices at a given electric field. The SEM pictures have shown that the carbon nanotubes density after activated is around 1%–10% of the non-activated samples. The field emission is improved if the CNT density per square centimeter is less than $1 \times 10^{10}$. Thus, the emission current is inversely proportional to the carbon nanotube density. FIG. 13 shows field emission from sites of non-activated pixels, while FIG. 14 shows light emission from sites of activated pixels.

What is claimed is:

1. A method for making a field emission cathode comprising the steps of:

depositing a carbon nanotube ("CNT") mixture on a cathode structure using a spraying process;

contacting the deposited CNT mixture with an adhesive material; and separating the adhesive material from the deposited CNT mixture.

2. The method as recited in claim 1, wherein the separating step further comprises the step of removing a portion of the deposited CNT mixture from the cathode structure.

3. The method as recited in claim 1, wherein the CNT mixture deposited in the depositing step has a CNT concentration of $1\times10^{10}$ CNT density per square centimeter or greater, and wherein the CNT mixture on the cathode structure after the separating step has a CNT concentration of less than $1\times10^{10}$ CNT density per square centimeter.

4. The method as recited in claim 1, wherein the CNT mixture on the cathode structure after the separating step has more alignment of CNTs substantially at a normal to a surface of cathode structure than the CNT mixture depositing in the depositing step before the separating step.

5. A method for making a field emission cathode comprising the steps of:
   depositing a carbon nanotube ("CNT") mixture on a cathode structure using a spraying process; and
   removing a portion of the deposited CNT mixture from the cathode structure.

6. The method as recited in claim 5, wherein the CNT mixture deposited in the depositing step has a CNT concentration of $1\times10^{10}$ CNT density per square centimeter or greater, and wherein the CNT mixture on the cathode structure after the removing step has a CNT concentration of less than $1\times10^{10}$ CNT density per square centimeter.

7. The method as recited in claim 5, wherein the CNT mixture on the cathode structure after the removing step has more alignment of CNTs substantially at a normal to a surface of cathode structure than the CNT mixture deposited in the depositing step before the removing step.

8. A method for making a field emission cathode comprising the steps of:
   depositing a carbon nanotube ("CNT") mixture on a cathode structure;
   contacting the deposited CNT mixture with an adhesive material; and separating the adhesive material from the deposited CNT mixture, wherein the CNT mixture is deposited in a plurality of wells in the cathode structure and wherein the adhesive material is attached to a backing film in a pattern that matches a pattern of the plurality of wells in the cathode structure so that when the contacting step is performed, the backing film is laid over the cathode structure so that the adhesive material inserts into the plurality of wells so that the adhesive material contacts the CNT mixture.

* * * * *